US012775068B2

(12) United States Patent
Alvarez et al.

(10) Patent No.: US 12,775,068 B2
(45) Date of Patent: Oct. 27, 2026

(54) COMPENSATING FOR A SENSOR DEFICIENCY IN A HETEROGENEOUS SENSOR ARRAY

(71) Applicant: Intel Corporation, Santa Clara, CA (US)

(72) Inventors: Ignacio J. Alvarez, Portland, OR (US); David Arditti Ilitzky, Guadalajara (MX); Patrick Andrew Mead, Portland, OR (US); Javier Felip Leon, Hillsboro, OR (US); David Gonzalez Aguirre, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 18/643,425

(22) Filed: Apr. 23, 2024

(65) Prior Publication Data

US 2026/0003037 A1 Jan. 1, 2026

Related U.S. Application Data

(63) Continuation of application No. 17/892,862, filed on Aug. 22, 2022, now Pat. No. 11,994,615, which is a
(Continued)

(51) Int. Cl.
*G01S 7/40* (2006.01)
*G01S 7/497* (2006.01)
(Continued)

(52) U.S. Cl.
CPC ............ *G01S 7/4004* (2013.01); *G01S 7/497* (2013.01); *G01S 13/58* (2013.01); *G01S 13/865* (2013.01);
(Continued)

(58) Field of Classification Search
None
See application file for complete search history.

(56) References Cited

U.S. PATENT DOCUMENTS 6,151,539 A 11/2000 Bergholz et al.
9,221,396 B1 12/2015 Zhu et al.
(Continued)

FOREIGN PATENT DOCUMENTS

CN 103776654 A * 5/2014 ............ G01M 13/00
CN 109308066 2/2019
(Continued)

OTHER PUBLICATIONS

"Motorola M68000 Family Programmer's Reference Manual," no author given; publication M68000PM/AD, Rev. 1; copyright 1992. (Year: 1992).*
(Continued)

*Primary Examiner* — Bernarr E Gregory
(74) *Attorney, Agent, or Firm* — Banner & Witcoff, Ltd.

(57) ABSTRACT

Apparatuses, methods and storage medium associated with compensating for a sensor deficiency in a heterogeneous sensor array are disclosed herein. In embodiments, an apparatus may include a compute device to aggregate perception data from individual perception pipelines, each of which is associated with respective one of different types of sensors of a heterogeneous sensor set, to identify a characteristic associated with a space to be monitored by the heterogeneous sensor set; detect a sensor deficiency associated with a first sensor of the sensors; and in response to a detection of the sensor deficiency, derive next perception data for more than one of the individual perception pipelines from sensor data originating from at least one second sensor of the sensors. Other embodiments may be disclosed or claimed.

18 Claims, 6 Drawing Sheets

200

Related U.S. Application Data continuation of application No. 16/614,741, filed as application No. PCT/US2017/042849 on Jul. 19, 2017, now Pat. No. 11,474,202.

(51) Int. Cl.

| | |
|---|---|
| ***G01S 13/58*** | (2006.01) |
| ***G01S 13/86*** | (2006.01) |
| ***G01S 13/931*** | (2020.01) |
| ***G01S 17/58*** | (2006.01) |
| ***G01S 17/86*** | (2020.01) |

(52) U.S. Cl.

CPC ............ *G01S 13/931* (2013.01); *G01S 17/58* (2013.01); *G01S 17/86* (2020.01); *G01S 2013/9318* (2020.01); *G01S 2013/93185* (2020.01); *G01S 2013/9323* (2020.01)

(56) References Cited

U.S. PATENT DOCUMENTS

| | | | | |
|---|---|---|---|---|
| 11,474,202 | B2 | 10/2022 | Alvarez et al. | |
| 11,994,615 | B2 | 5/2024 | Alvarez et al. | |
| 2011/0285516 | A1 | 11/2011 | Ritter | |
| 2014/0032167 | A1 | 1/2014 | Mayer et al. | |
| 2014/0142800 | A1 | 5/2014 | Zeng et al. | |
| 2014/0300504 | A1* | 10/2014 | Shaffer ................. | G01S 13/862 367/93 |
| 2015/0178998 | A1 | 6/2015 | Attard et al. | |
| 2016/0048399 | A1 | 2/2016 | Shaw | |
| 2017/0008487 | A1 | 1/2017 | Ur et al. | |
| 2017/0045362 | A1 | 2/2017 | Song et al. | |
| 2017/0096164 | A1 | 4/2017 | Sun et al. | |
| 2017/0123428 | A1 | 5/2017 | Levinson et al. | |
| 2017/0169627 | A1 | 6/2017 | Kim et al. | |
| 2017/0248953 | A1* | 8/2017 | Kelley .................... | G01S 13/87 |
| 2017/0351261 | A1 | 12/2017 | Levinson et al. | |
| 2018/0348374 | A1 | 12/2018 | Laddha et al. | |
| 2020/0200869 | A1 | 6/2020 | Alvarez et al. | |
| 2023/0123665 | A1 | 4/2023 | Alvarez et al. | |

FOREIGN PATENT DOCUMENTS

| | | | | |
|---|---|---|---|---|
| CN | 111033298 | | 4/2020 | |
| CN | 116804741 | | 9/2023 | |
| CN | 118859136 | | 10/2024 | |
| DE | 102010007520 | | 5/2011 | |
| DE | 102016123887 | | 6/2017 | |
| DE | 102016123887 | A1 | 6/2017 | |
| EP | 2604478 | | 6/2013 | |
| EP | 3655795 | | 5/2020 | |
| EP | 4325252 | | 2/2024 | |
| JP | H1019614 | A * | 1/1998 | ............ G01S 17/88 |
| JP | 2003329773 | | 11/2003 | |
| JP | 2010249613 | A * | 11/2010 | .............. G01S 7/40 |
| KR | 101470190 | | 12/2014 | |
| WO | 2017079321 | | 5/2017 | |
| WO | 2017079321 | A1 | 5/2017 | |
| WO | 2019017935 | | 1/2019 | |

OTHER PUBLICATIONS

"European Application Serial No. 24183470.4, Response filed Apr. 17, 2025 to Extended European Search Report mailed Sep. 24, 2024", 13 pgs.
"Chinese Application Serial No. 201780092310.2, Response Filed May 14, 2025 to Decision of Rejection mailed Feb. 18, 2025", w English Claims, 21 pgs.
"Chinese Application Serial No. 201780092310.2, Office Action mailed Aug. 8, 2024", w English Translation, 23 pgs.
"European Application Serial No. 24183470.4, Extended European Search Report mailed Sep. 24, 2024", 12 pgs.
"U.S. Appl. No. 17/892,862, Supplemental Notice of Allowability mailed Jan. 31, 2024", 4 pgs.
"U.S. Appl. No. 17/892,862, Notice of Allowance mailed Jan. 19, 2024", 9 pgs.
"U.S. Appl. No. 16/614,741, Preliminary Amendment filed Nov. 18, 2019", 8 pgs.
"International Application Serial No. PCT US2017 042849, International Search Report mailed Apr. 9, 2018", 4 pgs.
"International Application Serial No. PCT US2017 042849, Written Opinion mailed Apr. 9, 2018", 8 pgs.
"European Application Serial No. 17918663.0, Extended European Search Report mailed Jan. 25, 2021", 10 pgs.
"U.S. Appl. No. 16/614,741, Non Final Office Action mailed Jan. 4, 2022", 18 pgs.
"U.S. Appl. No. 16/614,741, Response filed Apr. 4, 2022 to Non Final Office Action mailed Jan. 4, 2022", 10 pgs.
"U.S. Appl. No. 16/614,741, Notice of Allowance mailed Jun. 7, 2022", 12 pgs.
"U.S. Appl. No. 16/614,741, 312 Amendment filed Jul. 12, 2022", 7 pgs.
"U.S. Appl. No. 16/614,741, PTO Response to 312 Amendment mailed Jul. 20, 2022", 2 pgs.
"U.S. Appl. No. 17/892,862, Preliminary Amendment filed Dec. 22, 2022", 7 pgs.
"European Application Serial No. 17918663.0, Communication pursuant to Article 94(3) EPC mailed Jun. 29, 2023", 2 pgs.
"U.S. Appl. No. 17/892,862, Non Final Office Action mailed Jul. 27, 2023", 16 pgs.
"U.S. Appl. No. 17/892,862, Response filed Oct. 25, 2023 to Non Final Office Action mailed Jul. 27, 2023", 10 pgs.
"U.S. Appl. No. 17/892,862, 312 Amendment filed Jan. 25, 2024", 7 pgs.
"International Application Serial No. PCT US2017 042849, International Preliminary Report on Patentability mailed Jan. 30, 2020", 10 pgs.
"European Application Serial No. 23211780.4, Extended European Search Report mailed Apr. 8, 2024", 10 pgs.
"European Application Serial No. 17918663.0, Response filed Aug. 23, 2021 to Extended European Search Report mailed Jan. 25, 2021", 14 pgs.
"European Application Serial No. 17918663.0, Response filed Nov. 9, 2023 to Communication pursuant to Article 94(3) EPC mailed Jun. 29, 2023", 10 pgs.
"U.S. Appl. No. 17/892,862, PTO Response to Rule 312 Communication mailed Apr. 23, 2024", 1 page.
"U.S. Appl. No. 17/892,862, Supplemental Notice of Allowability mailed Apr. 23, 2024", 2 pgs.
Realpe, Miguel, "A Fault Tolerant Perception system for autonomous vehicles", (Jul. 27-29, 2016), 6 pgs.
"European Application Serial No. 23211780.4, Extended European Search Report mailed Apr. 8, 2024", w Amended Claims, 59 pgs.
"Chinese Application Serial No. 201780092310.2, Response Filed Dec. 1, 2024 to Office Action mailed Aug. 8, 2024", w English Claims, 11 pgs.
"Chinese Application Serial No. 201780092310.2, Office Action mailed Dec. 13, 2024", w English translation, 37 pgs.
"Chinese Application Serial No. 201780092310.2, Response filed Feb. 6, 2025 to Office Action mailed Dec. 13, 2024", w current English claims, 21 pgs.
"Chinese Application Serial No. 201780092310.2, Decision of Rejection mailed Feb. 18, 2025", W English Translation, 25 pgs.
Realpe, M., et al.: "A Fault Tolerant Perception system for Autonomous Vehicles", 2016 35th Chinese Control Conference (CCC), TCCT, Jul. 27, 2016 (Jul. 27, 2016), pp. 6531-6536, XP032952436, DOI: 10.1109/CHICC.2016.7554385.
Feb. 25, 2026 (EP) Office Action—App. 23211780.4.
Feb. 25, 2026 (EP) Office Action—App. 24183470.4.

* cited by examiner

100

200

400

COMPENSATING FOR A SENSOR DEFICIENCY IN A HETEROGENEOUS SENSOR ARRAY

CROSS REFERENCE TO RELATED APPLICATIONS

The present application is a continuation of U.S. application Ser. No. 17/892,862, filed Aug. 22, 2022, now issued as U.S. Pat. No. 11,994,615, which is a continuation of U.S. application Ser. No. 16/614,741 filed Nov. 18, 2019, now issued as U.S. Pat. No. 11,474,202, which is a national phase entry under 35 U.S.C. § 371 of Int'l App. No. PCT/US2017/042849 filed Jul. 19, 2017, which designated, among the various States, the United States of America, the contents of each of which are hereby incorporated by reference in their entireties and for all purposes.

TECHNICAL FIELD

The present disclosure relates to the field of autonomous or semi-autonomous apparatuses, and more specifically relates to compensating for a sensor deficiency in a heterogeneous sensor array.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Autonomous or semi-autonomous apparatuses, such as self-driving vehicles, unmanned aerial vehicles (UAV, also referred to as drones), or robots, may rely on a multimodal set of sensors to perceive, map, and track the surroundings. The sensors may include several types such as long-range radar, mid-range radar front, night vision camera, video camera, reverse camera, ultrasound, mid-range radar back, or the like. Each type of sensor may have its own advantages and deficiencies.

Algorithms used by autonomous or semi-autonomous apparatuses (such as road detection algorithms, lane detection algorithms, traffic light detection algorithms, etc.) may be depend on a specific type of sensor of the set of sensors properly functioning. As a result of this dependency, if one of the sensors malfunctions (e.g., stops generating sensor data), capabilities of the autonomous or semi-autonomous apparatuses related to these algorithms may be completely lost. Autonomous or semi-autonomous apparatuses may be programmed to stop or land safely in such a condition.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
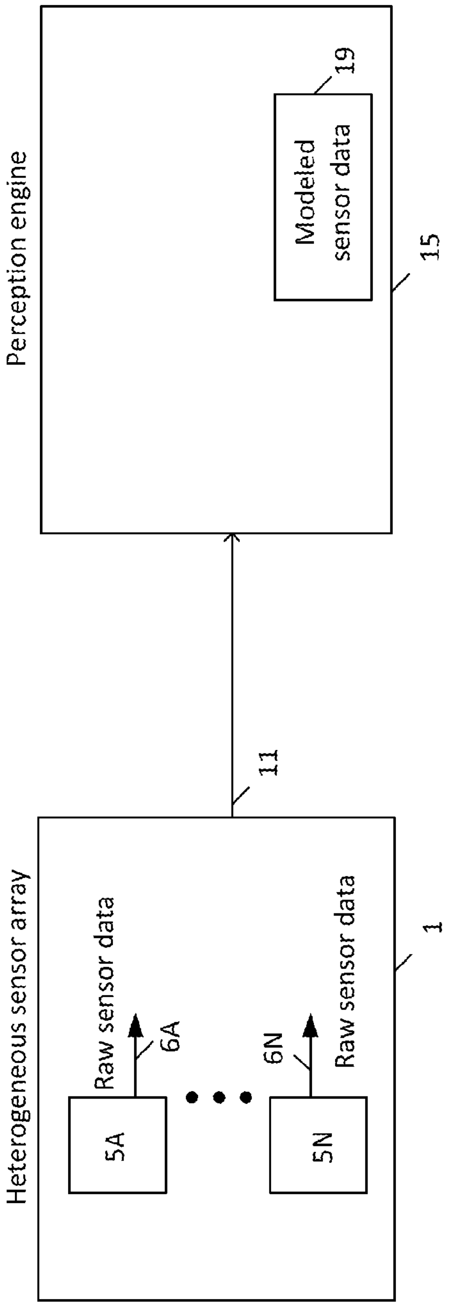
FIG. 1 illustrates an example system equipped with technology for compensating for a sensor deficiency in a heterogeneous sensor array, according to various embodiments.

Apparatuses, methods and storage medium associated with compensating for a sensor deficiency in a heterogeneous sensor array are disclosed herein. In embodiments, an apparatus to navigate along a trajectory may include a heterogeneous sensor array to monitor navigation along said trajectory, the heterogeneous sensor array including a plurality of different types of sensors; and a perception engine to: aggregate perception data from individual perception pipelines, each of which is associated with a respective one of the sensors, to identify a characteristic associated with the trajectory; detect a sensor deficiency associated with a first sensor of the sensors; and in response to a detection of the sensor deficiency, derive next perception data for more than one of the individual perception pipelines based on sensor data originating from at least one second sensor of the sensors.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In devices utilizing a multimodal set of sensors, the device may compensate for a sensor deficiency (e.g., sensor inactivity, a sensor malfunction, a sensor failure, a sensor reset, a security event associated with at least one of the sensors) in one modality by exploiting the information obtained from another modality. The device may be a component of a vehicle (such as a wheeled road or off-road motor vehicle or any other type of vehicle such as a vehicle to operate on rails, an aircraft, a watercraft, a robot, or the like, or combinations thereof) or a non-vehicle such as a stationary surveillance system that uses more than one sensor type.

Figure 6:
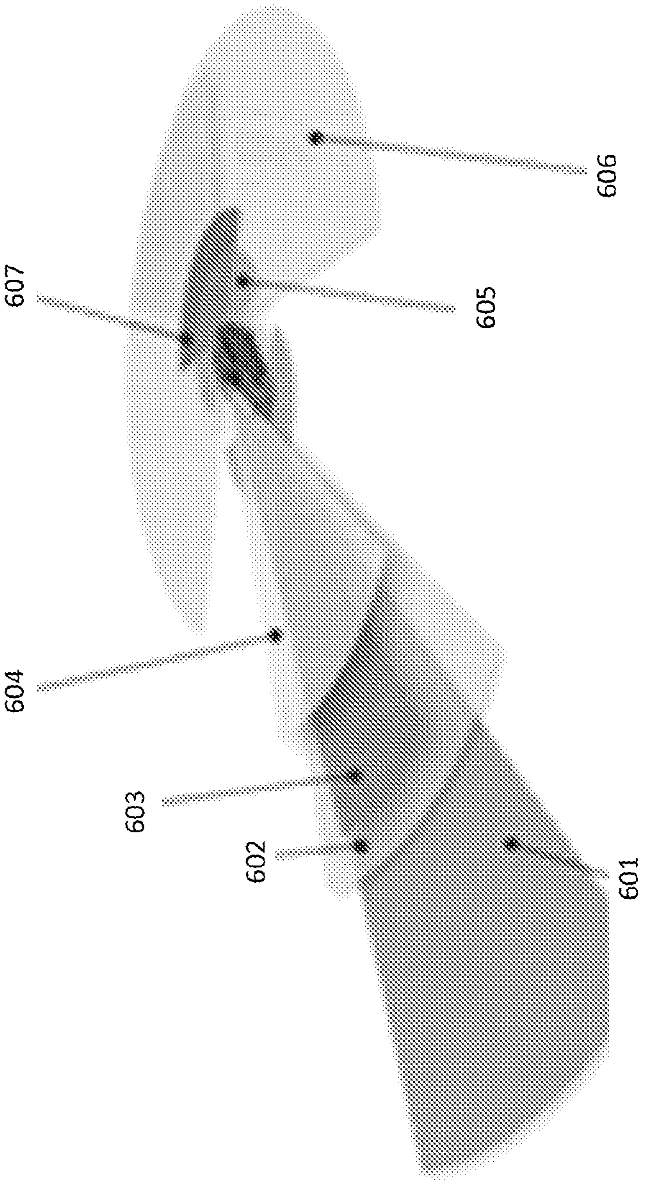
FIG. 6 illustrates monitored zones of a heterogeneous sensor array of a motor vehicle, according to various embodiments.

In some applications, each sensor of a heterogeneous sensor array may monitor a different physical space. For instance, in a heterogeneous sensor array in a motor vehicle embodiment, the sensors may monitor different spaces around the motor vehicle such as a particular zone in front of the motor vehicle or a particular zone behind the motor vehicle. Different types of sensors that may monitor respective zones in front of the motor vehicle may include: ultrasound, video camera (day and/or night vision), mid-range radar, and long range radar, or the like. Different types of sensors that may monitor respective zones behind the motor vehicle may include: ultrasound, reverse camera, or the like. The monitored zone of one sensor may overlap (e.g., partially overlap) by a monitored zone of another sensor. FIG. 6 illustrates monitored zones 601-607 around a motor vehicle (e.g., long range radar zone 601, mid-range radar front zone 602, night vision camera zone 603, video camera zone 604, ultrasound zone 605, mid-range radar back zone 606, and reverse camera zone 607), some of which are overlapping (e.g., partially overlapping).

In some embodiments, the device may use a sensor translation model to convert sensor data obtained from one modality into another modality. Upon sensor deficiency, the sensor translation model may be activated and/or provide the same input as the missing/defective sensors based on the available working sensors. In embodiments in which the sensor translation model is utilized in an autonomous vehicle (e.g., an autonomous motor vehicle), this conversion may allow the autonomous vehicle to operate safely in the event of a sensor malfunction without the need to modify the logic that governs the operational behavior of the autonomous vehicle. Also, the autonomous vehicle may not need to be equipped with a redundant sensor of the same type to operate safely in the case of a sensor malfunction (although a motor vehicle that is equipped with a duplicate sensor of the same type may of course utilize this conversion to operate safely in the event of a sensor deficiency affecting both of a sensor and its redundancy).

Some embodiments may utilize machine learning for minimizing the impact of the loss of an active sensor by compensating the lack of critical input data with reliable artificially generated data. Even though the quality of the "virtual" sensor data may not be as accurate as the lost sensor, the vehicle may still be able to maintain a complete perception pipeline and keep its operational capabilities. Before further describing the compensation technology, it should be noted, for ease of understanding, examples may be described for particular autonomous or semi-autonomous applications, self-driving vehicles, UAV, robot, and so forth. Presentation of applications in a particular autonomous or semi-autonomous application is not meant to be limiting. In general, the examples while described in context of one application, is nonetheless illustrative across the various autonomous or semi-autonomous applications.

FIG. 1 illustrates an example system 100 equipped with technology for compensating for a sensor deficiency in a heterogeneous sensor array 1, according to various embodiments. The system 100 includes a heterogeneous sensor array 1 and a perception engine 15 to generate sensor data 19 (e.g., modeled sensor data) based on a sensor array output 11.

The heterogeneous sensor array 1 may include any number of different types of sensors 5A-N. The sensors 5A-N may generate raw sensor outputs 6A-N, respectively. Each one of raw sensor outputs 6A-N may provide information about a different physical space monitored by the sensors 5A-N.

When all sensors 5A-N are operating normally, sensor array output 11 may include all of the raw sensor outputs 6A-N (and/or may include processed information based on all of the raw sensor outputs 6A-N). However, in the case of a sensor deficiency, sensor array output 11 may include only some of the raw sensor outputs 6A-N (and/or may include processed information based on only some of the raw sensor outputs 6A-N).

Perception engine 15 may detect a sensor deficiency of at least one of the sensors 5A-N. In embodiments in which perception engine 15 aggregates data from individual perception pipelines associated with raw sensor outputs 6A-N, respectively, perception engine 15 may detect the sensor deficiency by identifying a gap in one of the individual perception pipelines. Alternatively, or in addition to identifying a sensor deficiency based on a gap in a perception pipeline, perception engine 15 may receive control signals generated by one of the sensors 5A-N or another component, which may indicate a sensor deficiency (e.g., a rise or fall of a corresponding one of the control signals).

Following detection of a sensor deficiency, perception engine 15 may generate sensor data 19 (e.g., modeled sensor data) corresponding to the sensor associated with the sensor deficiency, from the remaining raw sensor outputs 6A-N. In other embodiments, the perception engine 15 may constantly generate modeled sensor data and may select a portion of the constantly generated modeled sensor data responsive to detection of the sensor deficiency. The perception engine 15 may identify the sensor data 19 responsive to the selection.

The sensor data 19 may be used to compensate for the sensor deficiency. For instance, in a motor vehicle including a LIDAR (light detection and ranging) sensor, a computer vision sensor (e.g., monocular/stereo/depth cameras), and a radar sensor, the device may compensate for a sensor deficiency of one of the LIDAR sensor, the camera, or the radar using sensor data generated by one or more of the others of the LIDAR sensor, the camera, or the radar.

In some embodiments, the perception engine 15 may feed sensor data 19 (which may be generated based on content from a subset of the perception pipelines) back into one or more of the individual perception pipelines that is/are associated with the sensor deficiency(s) to fill a perception pipeline gap or prevent a potential perception pipeline gap. The content of all the individual perception pipelines may then be aggregated to identify a characteristic associated with a space to be monitored by the sensor array 1. The characteristic may be the presence of an object if the heterogeneous sensor array 1 is used in a surveillance system, or the characteristic may be a characteristic of a trajectory (such as whether an obstacle is located along the trajectory) if the heterogeneous sensor array 1 is used in a vehicle, e.g., an autonomous vehicle or a vehicle with an automated driver warning system.

In some embodiments, an automated warning system to display data to a driver and/or a vehicle component to change a trajectory of the vehicle (an automatic braking and/or steering component) may receive the sensor data 19 or data derived from the sensor data 19 as an input. Algorithms used by this vehicle component (such as road detection algorithms, lane detection algorithms, traffic light detection algorithms, etc.) may continue to function based on the sensor data 19, and capabilities of the autonomous driving vehicle related to these algorithms may not be completely lost.

In examples in which the heterogeneous sensor array 1 is for a surveillance system having more than one sensor type, a surveillance system component to ascertain whether to output an alert based on the sensor types (e.g., an intruder alert) may receive the sensor data 19 or data derived from the sensor data 19 as an input. Surveillance may continue to function despite a sensor deficiency of one type of sensor.

Due to the compensation, redundancy for a specific sensor type may not be required. For example, the heterogeneous sensor array 1 may not need more than one LIDAR sensor, for instance. However, it may still be advantageous to use redundancy, and in embodiments using redundancy, the perception engine 15 may generate or identify the sensor data 19 only in the event of a sensor deficiency affecting one of the sensors 5A-N and its redundancy (or redundancies in the case of multiple redundancy).

Figure 2:
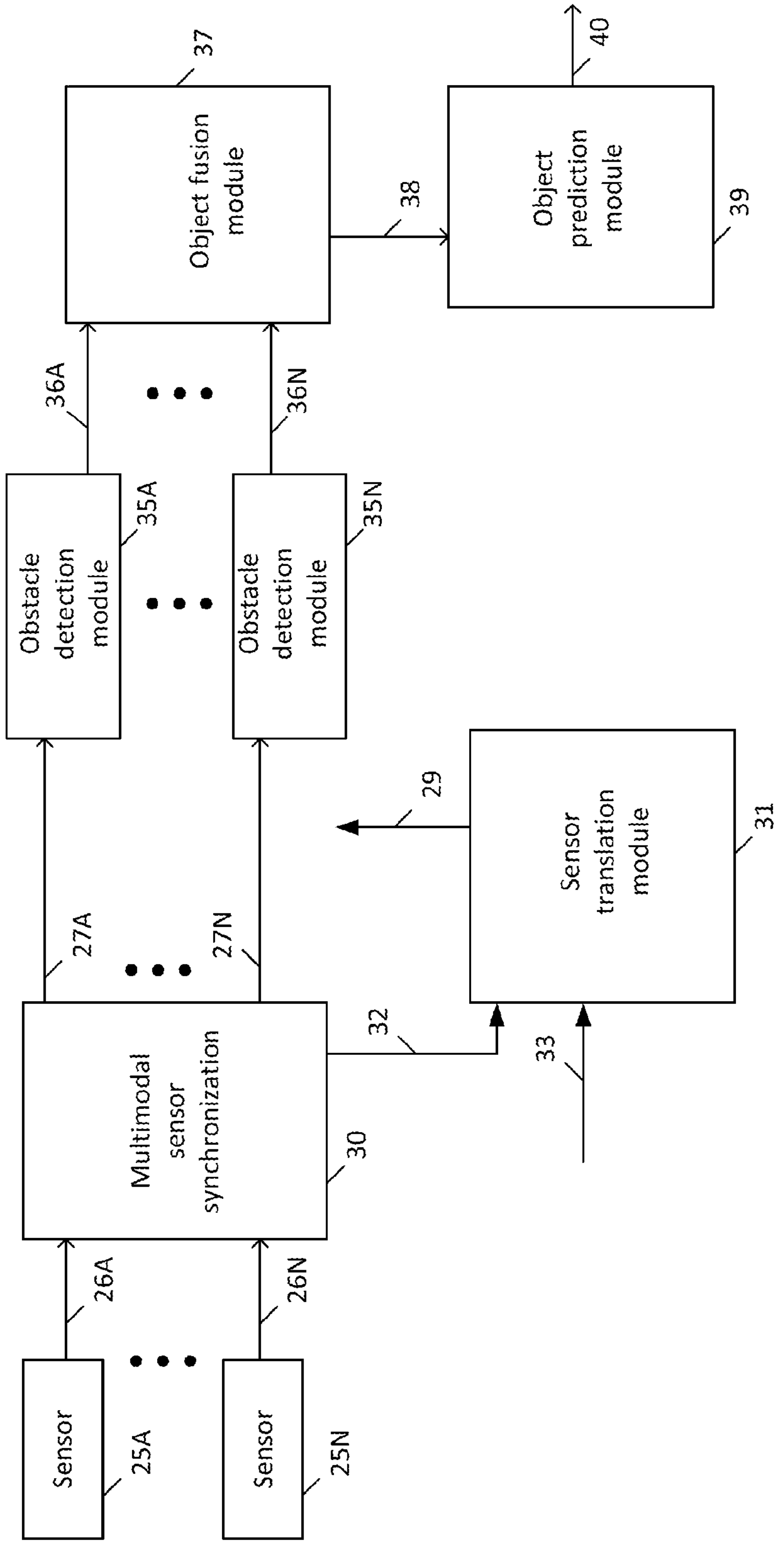
FIG. 2 illustrates another example system equipped with technology for compensating for a sensor deficiency of sensors of an autonomous vehicle or a vehicle with an automated driver warning system, according to various embodiments.

FIG. 2 illustrates another example system 200 equipped with technology for compensating for a sensor deficiency of sensors 25A-N of an autonomous vehicle or a vehicle with an automated driver warning system, according to various embodiments. The vehicle may be a wheeled road or off-road motor vehicle or any other type of vehicle such as a vehicle to operate on rails, an aircraft, a watercraft, a robot, or the like, or combinations thereof.

The sensors 25A-N may generate raw sensor outputs 26A-N, some of which may be of different sensor types (e.g., one of raw sensor outputs 26A-N, say raw sensor output 26A, may be for a first sensor type, and another one of raw sensor outputs 26A-N, say raw sensor output 26N, may be for a second different sensor type). In some examples, the first sensor type may be one LIDAR, camera, radar, or the like, and the other sensor type may be a different one of LIDAR, camera, radar, or the like. The system 200 may include a number of modules to operate on various points of perception and/or planning pipelines to create an accurate map of the surroundings, identify obstacles, and plan safe trajectories for the vehicle and/or identify warnings for the driver. These modules may include a multimodal sensor synchronization module 30, obstacle detection modules 35A-N, object fusion module 37, and object prediction module 39.

Multimodal sensor synchronization module 30 may synchronize the raw sensor data 26A-N to generate synchronized sensor data 27A-N. For example, multimodal sensor synchronization module 30 may perform buffering or other functions to output sensor data 27A-N, which may include synchronized frames for the raw sensor data 26A-N, respectively, in some examples.

In normal operation (e.g., no sensor deficiency), multimodal sensor synchronization module 30 may receive all of the raw sensor outputs 26A-N, and may output the respective sensor data 27A-N to the object detection modules 35A-N, respectively. In the normal operation, obstacle detection modules 35A-N may identify obstacle data 36A-N, respectively. The object fusion module 37 may fuse the obstacle data 36A-N into a single obstacle representation 38 of the surroundings. The object prediction module 39 may plan a trajectory and/or identify warnings for a driver based on the single obstacle representation 38, and generate a control output 40 to one or more vehicle components (such as automatic steering, automatic braking, a display (visual and/or audio) for a warning, or the like, or combinations thereof) to activate the vehicle components to cause the vehicle to execute safe maneuvers and/or display warnings.

In the event of a sensor deficiency, one or more of raw sensor outputs 26A-N may be unavailable, and a subset of the sensor data 27A-N may be output by the multimodal sensor synchronization module 30. In some embodiments, the sensor translation module 31 may detect one or more missing frames in one or more modalities from a received input 32 (input 32 may include some or all of the same subset of the sensor data 27A-N output by the multimodal sensor synchronization module 30 in the event of the sensor deficiency). Detection may be based on an analysis of the received frames of the input 32 and/or a control signal 33 from the affected ones of the sensors 25A-N or from multimodal sensor synchronization module 30 to indicate missing frame(s). Upon detection, sensor translation module 31 may provide an output 29, which may include modeled sensor data for the one(s) of the sensors 25A-N associated with the sensor deficiency. The output 29 may be provided to one(s) of obstacle detection modules 35A-35N associated, respectively, with the one(s) of the sensors 25A-N associated with the sensor deficiency. Each receiving one(s) of obstacle detection modules 35A-N may continue to output its portion of obstacle data 36A-36B based on the modeled sensor data.

As indicated previously, in some embodiments sensor translation module 31 may perform translation "on-demand", e.g., in response to a disruption of the flow of raw sensor data 26A-26N and/or sensor data 27A-N. In other embodiments, it may be possible and practical for sensor translation module 31 to constantly perform translation between various modalities (e.g., camera to LIDAR, camera to radar, radar to camera, etc.) and select appropriate translation(s) to be provided to a respective one of the obstacle detection modules 35A-N responsive to a disruption of the flow of raw sensor data 26A-26N and/or sensor data 27A-N. In embodiments with translation prior to disruption, zero-shot translation (the effect where sensor pairs for which there was not direct training data still produce acceptable translation) may be used to translate many different sensor combinations (for instances sensor pairs in one-to-one sensor translation) using a sensor translation model that may have been trained for only a subset of the sensor combinations. Use of zero-shot translation may reduce a size of sensor translation model data to be stored on the vehicle as compared to examples without zero-shot translation.

Sensor translation module 31 may be a one-to-one sensor translation module (e.g., to provide synthetic camera data based on LIDAR or radar, for example), a one-to-many (e.g., to provide synthetic camera and LIDAR data based on radar, for example), or a many-to-one sensor translation module (e.g., to provide synthetic camera data based on LIDAR and radar, for example), or any combination thereof. It may be possible and practical for a sensor translation module to use more than one sensor translation model to generate more than one set of modeled sensor data in response to a sensor deficiency. For instance, in response to a camera sensor deficiency, such a sensor translation module may provide first synthetic camera data based on LIDAR using a first sensor translation model (LIDAR to camera translation), and second synthetic camera data based on radar using a second sensor translation model (radar to camera translation). Such an output may be fused with sensor specific fusion techniques and both synthetic camera data may be fused.

The output 29 may include a confidence score to indicate to the object fusion module 37 that one of the pipelines is less precise than usual which may be taken into account at fusion and prediction time. Also, confidence scoring in the sensor translation model 31 may take place at a known delay that can be accounted for at the obstacle fusion model 37. Modeled sensor data of output 29 may carry the original sensor data timestamp allowing downstream devices to identify the delay and account for that delay.

The output 29 may include more than one translation. For example, the modeled sensor data of output 29 may include first sensor data based on a first subset of the raw sensor data 26A-N and second sensor data based on a second different subset of the raw sensor data 26A-N (e.g., synthetic LIDAR sensor data may include first synthetic LIDAR sensor data based on radar and second synthetic LIDAR sensor data based on camera). One or more of the obstacle detection modules 35A-N may compare the first and second sensor data prior to generating its obstacle data of obstacle data 36A-N, and include information based on the comparison in this portion of the obstacle data 36A-N and/or confidence scoring for each of the first sensor data and the second sensor data.

Figure 3:
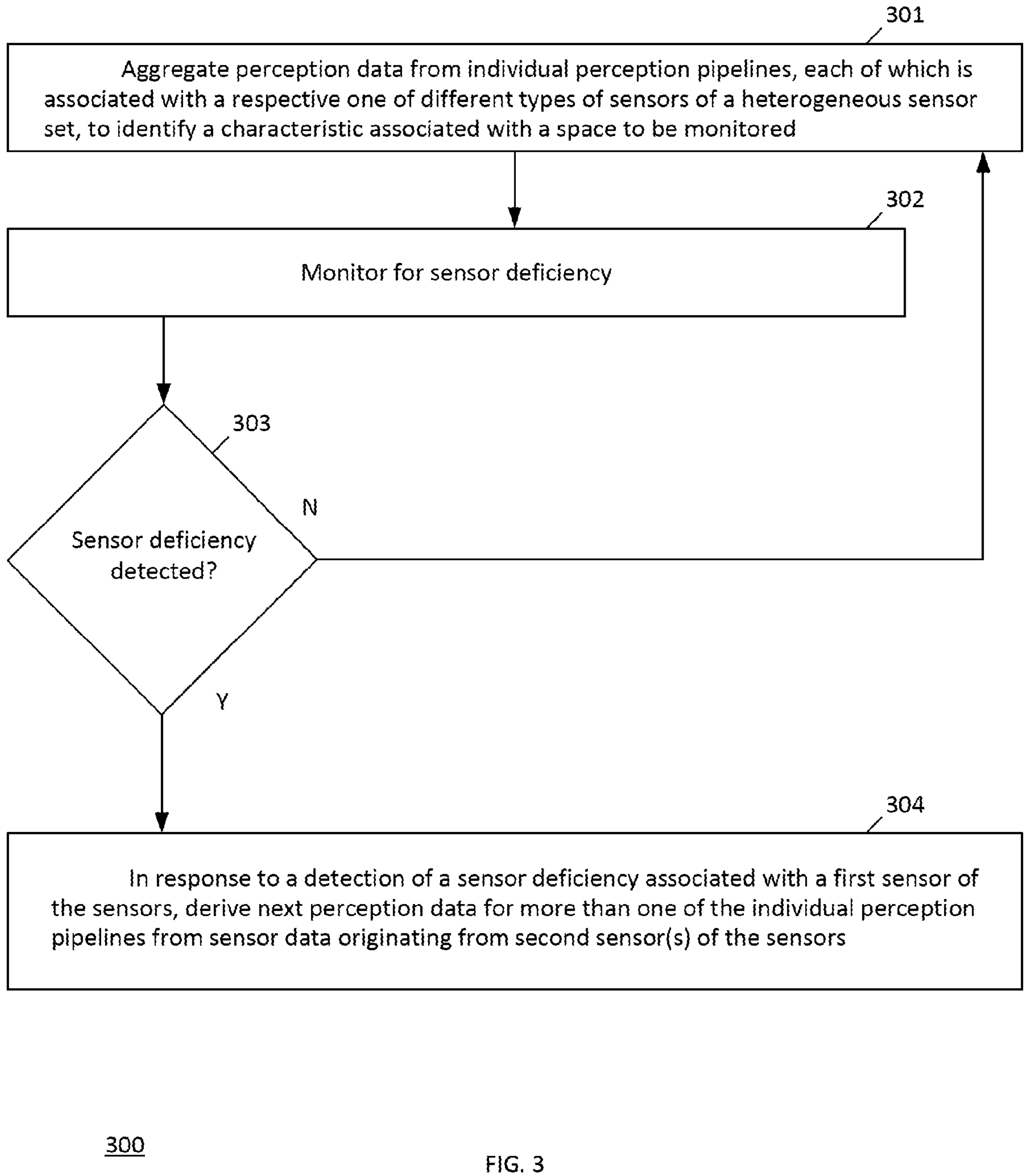
FIG. 3 is a flow chart showing a process of compensating for a sensor deficiency, according to various embodiments.

FIG. 3 is a flow chart showing a process 300 of compensating for a sensor deficiency, according to various embodiments. In block 301, a device such as the perception engine 15 of FIG. 1 or any other device described herein, may aggregate perception data from individual perception pipelines, each of which is associated with a respective one of different types of sensors of a heterogeneous sensor set, to identify a characteristic associated with a space to be monitored.

In block 302, the perception engine may monitor for sensor deficiency. These may be by inspecting the perception data or by evaluating a control signal, or combinations thereof. If no sensor deficiency is detected in diamond 303, then the process 300 may return to block 301.

If a sensor deficiency is detected in diamond 303, then in block 304 the perception engine 15 may, in response to a detection of a sensor deficiency associated with a first sensor of the sensors, derive next perception data for more than one of the individual perception pipelines from sensor data originating from second sensor(s) of the sensors. In embodiments utilizing redundancy, the process 300 may bypass block 304 if there is a sensor deficiency mitigatable using redundant sensors of the same type (if say a redundant sensor of the same type as the sensor affected by the sensor deficiency is fully operational, then block 304 may be bypassed).

Process 300 may be utilized not only with respect to vehicle sensors but to any other multimodal sensor suite that map an overlapping physical space. This may include, but is not limited to surveillance and/or robotics, such as service robotics.

Figure 4:
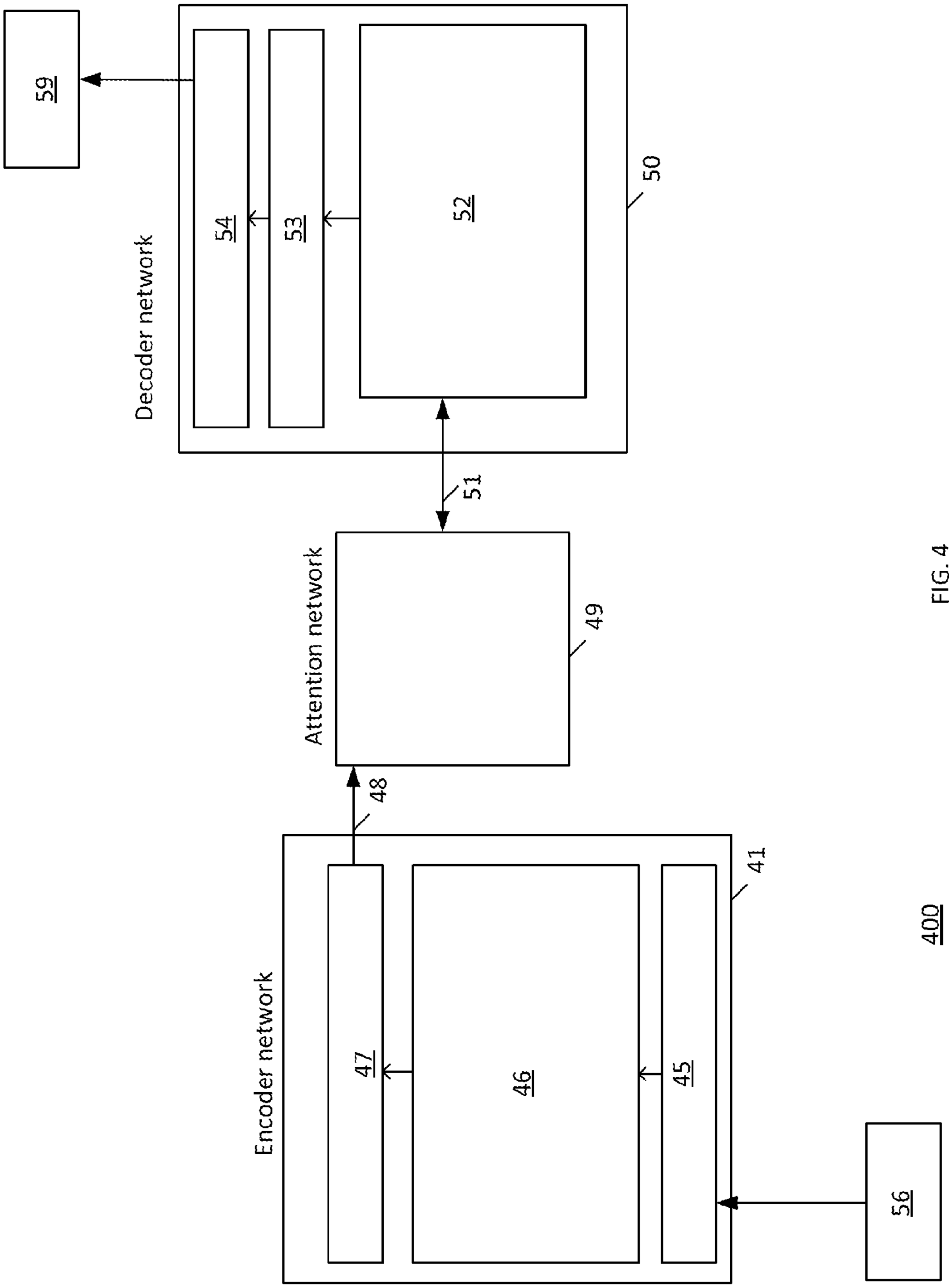
FIG. 4 illustrates a sensor translation model, in some embodiments.

FIG. 4 illustrates a sensor translation model 400, in some embodiments. The sensor translation model 400 may be trained based on neural machine translation principles. The sensor translation model 400 may include an encoder network 41, an attention network 49, and a decoder network 50.

The encoder network 41 and decoder network 50 may be formed using an RNN (recurrent neural network) such as a multi layered network composed of LTSMs (long short-term memory networks). The LTSM layers of the encoder network 41 may include a first layer 45, one or more hidden second layers 46 (e.g., hidden LSTM layers in a deep LTSM encoder), and a third layer 47. The LTSM layers of the decoder network 50 may include one or more first layers 52 (e.g., hidden LSTM layers in a deep LTSM decoder), a second layer 53, and a third layer 54.

The encoder network 41 may input data 56 (e.g., initial sensor data) as a feature vector of particular dimensions (sensor resolution), and may extract the higher level object information in the frame. The decoder network 50 may perform the opposite function as the encoder network 41, which may include translating the abstracted frame understanding to a sensor data output 59.

The process may be guided (weighted) by an attention network 49, which may be composed of a Multilayer Perceptron Network (MPN) that stores the context vector of the hidden layers of the encoder network 41. The attention network 49 may provide the decoder network 50 with weights on spatial regions of interest during the translation of the input data 56 (the weights may be part of the bi-directional arrow 51). This may allow the decoder network 50 to "fix its gaze" on salient objects in the frame context while translating the targeted sensor output. The decoder network 50 may transmit communications to the attention network to request information from the attention network 49 (these requests may be part of the bi-directional arrow 51). The sensor data output 59 may be analyzed using actual sensor data for the sensor to which the sensor data output 59 is to simulate as part of the training process and/or evaluation of the training process.

In some embodiments, the encoder network 41 may extract features from the input data 56 and learn the information encoding modelling of the particular sensor. The first layer 45 of the encoder network 41 may provide the feature set extracted from the raw sensor data. In some embodiments, this may be performed using a convolutional neural network stripped of the classification layer. Other approaches may use convolutional auto-encoders or variational auto-encoders. The feature vector may then be fed into one or more second hidden layers 46, e.g., a Deep LSTM network. LSTM networks may be particularly suited to "forget" unnecessary information such as noise artifacts picked during the feature encoding at a particular frame. Because information encoded at $t_h$ affects the information remembered at $t_{h+1}$ overtime the result may be a robust model of information modelling for the particular sensor input. A third layer 47 (e.g., a softmax layer) may be used to convert the individual vector scores into a distribution. The output 48 of the encoder 41 at a particular time $t_h$ may be the hidden vector $h^{enc}$.

In some embodiments, the attention network 49 may focus the feature translation at the decoder network 50 on a subset of the information on the frame. The general mechanism may work in a similar way that human sight glances around a picture to describe it. At every step of the sensor data translation, the attention network 49 may focus on different spatial regions of interest. The attention network 49 may focus by providing a context vector ($\hat{z}_t$) governed by the following function ø: $\hat{z}_t=ø(\{h^{enc}_i\}, \{\alpha_i\})$, where $h^{enc}_i$ is the feature vector corresponding to the encoder network 41 and $\alpha_i$ is the weight of the feature vector. The weight of the feature vector at a particular time $t_h$ is may be computed by an attention model function that depends on the previous state $t_{h-1}$. With this model, the attention state (region of interest) at a particular time may depend on the features that were translated before.

The function of the decoder network 50 may be to reconstitute the sensor data to the particular target sensor output, in essence following opposite steps from the encoder network 41. Where the input is the hidden vector from the encoder $h^{enc}$ and the output is the generated target sensor data. In some examples, this process may be performed through a deep LSTM network that contains the target sensor model. The translation may be guided by the attention network 49 as described previously. The result of the one or more first layers 52 may be the hidden vector $h^{dec}$ that gets fed into the second layer 53 (e.g., a de-convolution decoder network) trained to output the target sensor format. The third layer 54 may be similar to the third layer 47.

In some examples, configuration data to represent the sensor translation model 400 may be produced using one or more datacenters. This configuration data may be embedded at manufacture onto a device, such as a vehicle with sensors, a surveillance system with sensors, a robotics component with sensors, or some different types with more than one type of sensor to monitor an overlapping physical space. In some examples, the configuration data may be downloaded from the datacenter(s) over a network to the device after manufacture to provide an update. In some examples, a processor of the device may re-train the sensor translation model 400. Re-training may be used to compensate for different operational variables between the ones associated with generation of the input data and operational variables affecting sensors of the device in field operation (for instance, different weather). Re-training may be concurrent or non-concurrent with processing perception pipelines. In concurrent re-training, an independent processor resources and/or different processing cores of a processor of the device may be used for re-training and perception pipeline processing.

In some examples, after the sensor translation model 400 is trained and/or retrained, the trained and/or retrained sensor translation model may be provided to a processor component (e.g., a processor core) of a vehicle with sensors, a surveillance system with sensors, a robotics component with sensors, or some different types with more than one type of sensor to monitor an overlapping physical space. The provided sensor translation model may include a descriptor of the topology with the initialized weights and values in hidden and surface layers that have results from training and/or retraining sensor translation on the sensor array. The training and/or retraining may occur in an independent processor component (e.g., a different core of the processor of the vehicle), in some examples. The processing component receiving the provided sensor translation model may utilize this sensor translation model to perform sensor translation tasks at runtime. For instance, this processing component may use this sensor translation model to generate the confidence scores.

Figure 5:
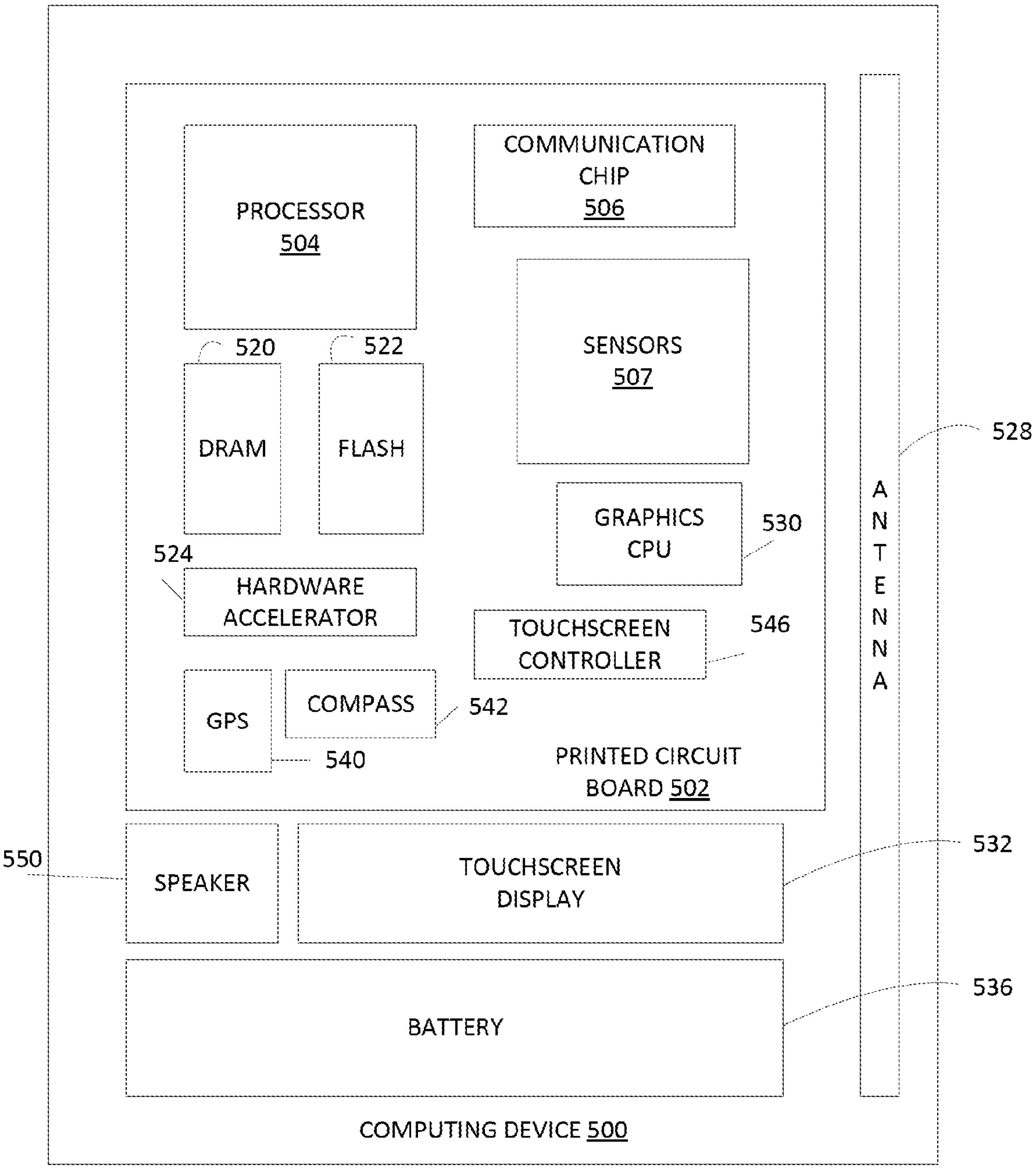
FIG. 5 illustrates an example compute device that may employ the apparatuses and/or methods described herein, according to various embodiments.

FIG. 5 illustrates an example compute device 500 that may employ the apparatuses and/or methods described herein, according to various embodiments (for instance, any apparatus and/or method associated with any compute device or electronic device described earlier with respect to FIGS. 1-4 and 6). In embodiments, the example compute device 500 may be installed in an autonomous or semi-autonomous vehicles, i.e., self-driving vehicles, UAV, robots, and so forth. As shown, the example compute device 500 may include a number of components, such as one or more processors 504 (one shown), at least one communication chip 506, and sensors 507 of different types. The at least one communication chip 506 may have an interface to interface with a network to obtain a trained sensor translation model and/or to receive raw sensor data from additional remote sensors (not shown).

In various embodiments, the one or more processors 504 each may include one or more processor cores. In various embodiments, the at least one communication chip 506 may be physically and electrically coupled to the one or more processors 504. In further implementations, the at least one communication chip 506 may be part of the one or more processors 504. In various embodiments, compute device 500 may include printed circuit board (PCB) 502. For these embodiments, the one or more processors 504 and the at least one communication chip 506 may be disposed thereon.

Depending on its applications, compute device 500 may include other components that may or may not be physically and electrically coupled to the PCB 502. These other components include, but are not limited to, a memory controller (not shown), volatile memory (e.g., dynamic random access memory (DRAM) 520), non-volatile memory such as flash memory 522, hardware accelerator 524, an I/O controller (not shown), a digital signal processor (not shown), a crypto processor (not shown), a graphics processor 530, one or more antenna 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, and a mass storage device (such as hard disk drive, a solid state drive, compact disk (CD), digital versatile disk (DVD)) (not shown), and so forth.

In some embodiments, the one or more processor 504, DRAM 520, flash memory 522, and/or a storage device (not shown) may include associated firmware (not shown) storing programming instructions configured to enable compute device 500, in response to execution of the programming instructions by one or more processor 504, to perform methods described herein such as compensating for a sensor deficiency in a heterogeneous sensor array. In various embodiments, these aspects may additionally or alternatively be implemented using hardware separate from the one or more processor 504, flash memory 512, or storage device 511, such as hardware accelerator 524 (which may be a Field Programmable Gate Array (FPGA)).

The at least one communication chip 506 may enable wired and/or wireless communications for the transfer of data to and from the compute device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The at least one communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 5G, 5G, and beyond. The at least one communication chip 506 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the compute device 500 may be a component of a vehicle, a component of a robot, a component of a surveillance system, a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, and/or a digital video recorder. In further implementations, the compute device 500 may be any other electronic device that processes data.

One or more networks and/or datacenters (similar to any networks and/or datacenters described herein such as those described with reference to FIG. 4) may be used to generate a sensor translation model to be used by the compute device 500. These networks and/or datacenters may include a system of distributed compute devices that may each include components similar to any of the compute device 500 components. The compute devices of the networks and/or datacenters may not require sensors 507 as such compute devices may receive input sensor data collected from compute device 500 or some other similar compute device (say a prototype of compute device 500) with sensors similar to sensors 507.

Any combination of one or more computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLES

Example 1 is an apparatus for compensating for a sensor deficiency in a heterogeneous sensor array. The apparatus may include a heterogeneous sensor array to monitor a physical space, the heterogeneous sensor array including a plurality of different types of sensors; and a perception engine to: aggregate perception data from individual perception pipelines, each of which is associated with a respective one of the sensors, to identify a characteristic associated with the physical space; detect a sensor deficiency associated with a first sensor of the sensors; and in response to a detection of the sensor deficiency, derive next perception data for more than one of the individual perception pipelines based on sensor data originating from at least one second sensor of the sensors.

Example 2 includes the subject matter of example 1 (or any other example described herein), further comprising the perception engine to, responsive to the detection of the sensor deficiency, access a sensor translation model to convert the sensor data for the at least one second sensor into synthetic sensor data for the first sensor, wherein the next perception data of the perception pipeline of the first sensor is based on the synthetic sensor data.

Example 3 includes the subject matter of any of examples 1-2 (or any other example described herein), wherein the sensor translation model comprises at least one of a radar-to-LIDAR (light detection and ranging) translation model, a LIDAR-to-camera translation model, or a camera-LIDAR translation model.

Example 4 includes the subject matter of any of examples 1-3 (or any other example described herein), wherein the at least one second sensor of the sensors comprises a plurality of the sensors, wherein each sensor of the plurality of sensors is different than the first sensor.

Example 5 includes the subject matter of any of examples 1-4 (or any other example described herein), wherein the perception data comprises obstacle data, and wherein the physical space comprises a physical space associated with a trajectory, and wherein the characteristic associated with the physical space comprises an obstacle characteristic.

Example 6 includes the subject matter of any of examples 1-5 (or any other example described herein), further comprising the perception engine to: responsive to the detection of the sensor deficiency, identify whether a redundant sensor of the same type as the first sensor is available; and access a sensor translation model responsive to the redundant sensor of the same type as the first sensor not available.

Example 7 includes the subject matter of any of examples 1-6 (or any other example described herein), wherein the sensor deficiency is based on at least one of sensor inactivity, a sensor malfunction, a sensor failure, a sensor reset, or security event associated with at least one of the sensors.

Example 8 includes the subject matter of any of examples 1-7 (or any other example described herein), wherein the perception engine includes a processor and one or more perception modules operated by the processor.

Example 9 includes the subject matter of any of examples 1-8 (or any other example described herein), wherein the apparatus comprises an autonomous or semi-autonomous mobile device Example 10 includes the subject matter of any of examples 1-9 (or any other example described herein), wherein the apparatus comprises a vehicle including an automated warning system to display data to a driver based on an identification of the characteristic.

Example 11 is computer readable media for compensating for a sensor deficiency in a heterogeneous sensor array. The computer readable media may include executable instructions, wherein the instructions, in response to execution by a processor, cause the processor to: aggregate perception data from individual perception pipelines, each of which is associated with respective one of different types of sensors of a heterogeneous sensor set, to identify a characteristic associated with a space to be monitored by the heterogeneous sensor set; detect a sensor deficiency associated with a first sensor of the sensors; and in response to a detection of the sensor deficiency, derive next perception data for more than one of the individual perception pipelines from sensor data originating from at least one second sensor of the sensors.

Example 12 includes the subject matter of example 11 (or any other example described herein), wherein the perception data comprises at least one of surveillance data or data obtained from monitoring navigation of a device along a trajectory.

Example 13 includes the subject matter of any of examples 11-12 (or any other example described herein), wherein the instructions are further to cause the processor to, responsive to detecting the sensor deficiency, access a sensor translation model to convert the sensor data for the at least one second sensor into simulated sensor data for the first sensor, wherein the next perception data of the perception pipeline of the first sensor is based on the simulated sensor data.

Example 14 includes the subject matter of any of examples 11-13 (or any other example described herein), wherein the sensor translation model comprises at least one of a radar-to-LIDAR (light detection and ranging) translation model, a LIDAR-to-camera translation model, or a camera-LIDAR translation model.

Example 15 includes the subject matter of any of examples 11-14 (or any other example described herein), wherein the instructions are further to cause the processor to: responsive to the detection of the sensor deficiency, identify whether a redundant sensor of the same type as the first sensor is available; and access a sensor translation model responsive to the redundant sensor of the same type as the first sensor not available.

Example 16 is an apparatus for compensating for a sensor deficiency in a heterogeneous sensor array. The apparatus may include an object prediction module to output information to be used for at least one of trajectory planning system or a driver warning system; an object fusion module coupled to an input of the object prediction module, the object fusion module to aggregate perception data from individual perception pipelines, each of which is associated with one of a plurality of different types of sensors of a heterogeneous sensor set, and output aggregated perception data to the object prediction module; a plurality of object detection modules coupled to an input of the object fusion module, each object detection module to generate information of a respective one of the individual perception pipelines; and a sensor translation model selectively coupled to at least one input of the plurality of object detection modules, the sensor translation model to convert information that is based on raw sensor data of a first sensor of the heterogeneous sensor set into synthetic sensor data for a second sensor of the heterogeneous sensor set in response to a sensor deficiency associated with the second sensor.

Example 17 includes the subject matter of example 16 (or any other example described herein), further comprising a multimodal sensor synchronization module selectively coupled to an input of the sensor translation model, the multimodal sensor synchronization module to generate the information based on the raw sensor data.

Example 18 includes the subject matter of any of examples 16-17 (or any other example described herein), wherein an output of the sensors of the heterogeneous sensor set is coupled to an input of the multimodal sensor synchronization module.

Example 19 includes the subject matter of any of examples 16-18 (or any other example described herein), wherein the sensor translation model comprises a one-to-many sensor translation model.

Example 20 includes the subject matter of any of examples 16-19 (or any other example described herein), wherein the sensor translation model comprises at least one of a radar-to-LIDAR (light detection and ranging) translation model, a LIDAR-to-camera translation model, or a camera-LIDAR translation model.

Example 21 is a device for compensating for a sensor deficiency in a heterogeneous sensor array. The device may include an automatic braking and/or steering component; and a heterogeneous sensor array to monitor navigation of the device along a trajectory, the heterogeneous sensor array including a plurality of different types of sensors; and a perception engine to: aggregate perception data from individual perception pipelines, each of which is associated with a respective one of the sensors, to identify a characteristic associated with the trajectory; detect a sensor deficiency associated with a first sensor of the sensors; derive next perception data for more than one of the individual perception pipelines based on sensor data originating from at least one second sensor of the sensors; and control the automatic braking and/or steering component based on the next perception data.

Example 22 includes the subject matter of example 21 (or any other example described herein), further comprising the processor to, responsive to detecting the sensor deficiency, access a sensor translation model to convert the sensor data for the at least one second sensor into synthetic sensor data for the first sensor, wherein the next perception data of the perception pipeline of the first sensor is based on the synthetic sensor data.

Example 23 includes the subject matter of any of examples 21-22 (or any other example described herein), wherein the sensor translation model comprises at least one of a radar-to-LIDAR (light detection and ranging) translation model, a LIDAR-to-camera translation model, or a camera-LIDAR translation model.

Example 24 includes the subject matter of any of examples 21-23 (or any other example described herein), wherein the sensor deficiency is based on at least one of sensor inactivity, a sensor malfunction, a sensor failure, a sensor reset, or security event associated with at least one of the sensors.

Example 25 includes the subject matter of any of examples 21-24 (or any other example described herein), wherein the sensor translation model comprises a one-to-many sensor translation model.

Example 26 is an apparatus for compensating for a sensor deficiency in a heterogeneous sensor array. The apparatus may include means for aggregating perception data from individual perception pipelines, each of which is associated with respective one of different types of sensors of a heterogeneous sensor set, to identify a characteristic associated with a space to be monitored by the heterogeneous sensor set; and means for deriving next perception data for more than one of the individual perception pipelines from sensor data originating from at least one first sensor of the sensors in response to a detection of a sensor deficiency associated with a second different sensor of the sensors.

Example 27 includes the subject matter of example 26 (or any other example described herein), wherein the perception data comprises at least one of surveillance data or data obtained from monitoring navigation of a device along a trajectory.

Example 28 includes the subject matter of any of examples 26-27 (or any other example described herein), further comprising means for translating the sensor data for the at least one second sensor into sensor data for the first sensor responsive to the detection of the sensor deficiency, wherein the next perception data of the perception pipeline of the first sensor is based on the sensor data.

Example 29 includes the subject matter of any of examples 26-28 (or any other example described herein), wherein the means for translating comprises at least one of a radar-to-LIDAR (light detection and ranging) translation model, a LIDAR-to-camera translation model, or a camera-LIDAR translation model.

Example 30 includes the subject matter of any of examples 26-29 (or any other example described herein), further comprising means for identifying whether a redundant sensor of the same type as the second sensor is available responsive to the detection of the sensor deficiency; and means for accessing a sensor translation model responsive to the redundant sensor of the same type as the second sensor not available.

Example 31 is a method for compensating for a sensor deficiency in a heterogeneous sensor array. The method may include aggregating perception data from individual perception pipelines, each of which is associated with respective one of different types of sensors of a heterogeneous sensor set, to identify a characteristic associated with a space to be monitored by the heterogeneous sensor set; and deriving next perception data for more than one of the individual perception pipelines from sensor data originating from at least one first sensor of the sensors in response to a detection of a sensor deficiency associated with a second different sensor of the sensors.

Example 32 includes the subject matter of example 31 (or any other example described herein), wherein the perception data comprises at least one of surveillance data or data obtained from monitoring navigation of a device along a trajectory.

Example 33 includes the subject matter of any of examples 31-32 (or any other example described herein), further comprising translating the sensor data for the at least one second sensor into sensor data for the first sensor responsive to the detection of the sensor deficiency, wherein the next perception data of the perception pipeline of the first sensor is based on the sensor data.

Example 34 includes the subject matter of any of examples 31-33 (or any other example described herein), wherein the translation utilizes at least one of a radar-to-LIDAR (light detection and ranging) translation model, a LIDAR-to-camera translation model, or a camera-LIDAR translation model.

Example 35 includes the subject matter of any of examples 31-34 (or any other example described herein), further comprising: identifying whether a redundant sensor of the same type as the second sensor is available responsive to the detection of the sensor deficiency; and accessing a sensor translation model responsive to the redundant sensor of the same type as the second sensor not available.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system, comprising:

an interface to a multimodal sensor array having multiple sensors, the multiple sensors including respective sensor types to monitor a physical environment of a vehicle; and processing circuitry connected to the interface, the processing circuitry configured to:

provide sensor data generated by the respective sensor types of the multiple sensors to corresponding perception pipelines, the perception pipelines to detect objects in the physical environment;

obtain partial information of an object based on first sensor data associated with a first sensor type of the multiple sensors; and in response to obtaining the partial information, use second sensor data associated with a second sensor type of the multiple sensors to compensate for the partial information of the object.

2. The system of claim 1, wherein the processing circuitry is further configured to perform fusion of features of the object to compensate for the partial information, the fusion of features including combining features detected from the first sensor data with features detected from the second sensor data.

3. The system of claim 2, wherein the fusion of features of the object is performed based on a fusion of spatial representations of the physical environment.

4. The system of claim 3, wherein the fusion of features of the object is performed based on the spatial representations of the physical environment captured at multiple times.

5. The system of claim 2, wherein the perception pipelines use respective neural networks, and wherein the features detected from the first sensor data and the features detected from the second sensor data are produced from the respective neural networks.

6. The system of claim 2, wherein the processing circuitry is further configured to perform multimodal object detection of the object, based on the fusion of features of the object.

7. The system of claim 2, wherein the processing circuitry is further configured to compute an output for one or more advanced driver-assistance systems or automated driving systems of the vehicle, based on the fusion of features of the object.

8. The system of claim 1, wherein the multimodal sensor array includes multiple cameras, radar sensors, and lidar sensors.

9. The system of claim 8, wherein the perception pipelines detect respective objects including the object, based on the sensor data generated by the multiple cameras, the radar sensors, and the lidar sensors.

10. A non-transitory computer-readable storage medium having stored thereon instructions that, when executed, cause at least one processor to:

receive sensor data from an interface to a multimodal sensor array, the multimodal sensor array having multiple sensors of respective sensor types to monitor a physical environment of a vehicle;

provide the sensor data generated by the respective sensor types of the multiple sensors to corresponding perception pipelines, the perception pipelines to detect objects in the physical environment;

obtain partial information of an object based on first sensor data associated with a first sensor type of the multiple sensors; and in response to obtaining the partial information, use second sensor data associated with a second sensor type of the multiple sensors to compensate for the partial information of the object.

11. The non-transitory computer-readable storage medium of claim 10, the instructions further to cause the at least one processor to:

perform fusion of features of the object to compensate for the partial information, the fusion of features including combining features detected from the first sensor data with features detected from the second sensor data.

12. The non-transitory computer-readable storage medium of claim 11, wherein the fusion of features of the object is performed based on a fusion of spatial representations of the physical environment.

13. The non-transitory computer-readable storage medium of claim 12, wherein the fusion of features of the object is performed based on the spatial representations of the physical environment captured at multiple times.

14. The non-transitory computer-readable storage medium of claim 11, wherein the perception pipelines use respective neural networks, and wherein the features detected from the first sensor data and the features detected from the second sensor data are produced from the respective neural networks.

15. The non-transitory computer-readable storage medium of claim 11, the instructions further to cause the at least one processor to:

perform multimodal object detection of the object, based on the fusion of features of the object.

16. The non-transitory computer-readable storage medium of claim 11, the instructions further to cause the at least one processor to:

compute an output for one or more advanced driver-assistance systems or automated driving systems of the vehicle, based on the fusion of features of the object.

17. The non-transitory computer-readable storage medium of claim 10, wherein the multimodal sensor array includes multiple cameras, radar sensors, and lidar sensors.

18. The non-transitory computer-readable storage medium of claim 17, wherein the perception pipelines detect respective objects including the object, based on the sensor data generated by the multiple cameras, the radar sensors, and the lidar sensors.

* * * * *